United States Patent [19]

Ranner et al.

[11] Patent Number: 5,408,682
[45] Date of Patent: Apr. 18, 1995

[54] IDENTIFICATION CODE SEARCH IN A COMMUNICATION DEVICE

[75] Inventors: Georg Ranner, Lauf/Peg.; Jürgen Höflinger, Röthenbach/Peg., both of Germany

[73] Assignee: U.S. Philips Corporation, New York, N.Y.

[21] Appl. No.: 927,779

[22] Filed: Aug. 10, 1992

Related U.S. Application Data

[63] Continuation of Ser. No. 533,652, Jun. 5, 1990, abandoned.

[30] Foreign Application Priority Data

Jun. 8, 1989 [DE] Germany ............... 39 18 696.2

[51] Int. Cl.6 ................................................ H04Q 7/00
[52] U.S. Cl. ................... 455/32.1; 455/34.2; 455/166.2; 379/62
[58] Field of Search .............. 455/62, 67.1, 226.1, 455/77, 161.1, 161.2, 166.1, 166.2, 343, 32.1, 34.1, 34.2; 379/58, 59, 62

[56] References Cited

U.S. PATENT DOCUMENTS

| | | | |
|---|---|---|---|
| 4,741,049 | 4/1988 | De Jager et al. ............ | 455/32 |
| 4,744,101 | 5/1988 | Saegusa ....................... | 379/58 |
| 4,896,370 | 1/1990 | Kasparian et al. ........... | 455/77 |
| 4,921,464 | 5/1990 | Ito et al. ...................... | 455/166 |
| 4,977,611 | 12/1990 | Maru ........................... | 455/166 |

FOREIGN PATENT DOCUMENTS

| | | | |
|---|---|---|---|
| 0137943 | 8/1984 | European Pat. Off. ....... | H04B 7/26 |
| 0248351 | 5/1987 | European Pat. Off. ...... | H04M 1/72 |
| 0258739 | 3/1988 | European Pat. Off. . | |
| 0282087 | 3/1988 | European Pat. Off. ....... | H04Q 7/04 |
| 0299515 | 7/1988 | European Pat. Off. ...... | H04M 1/72 |
| 2219466 | 6/1988 | United Kingdom .......... | H04Q 7/04 |

*Primary Examiner*—Edward F. Urban
*Attorney, Agent, or Firm*—Anne E. Barschall

[57] ABSTRACT

With cordless telephones it is a known fact that each pair of radio stations has m radio channels out of n possible radio channels in common. During a test cycle the mobile unit examines only the common radio channels. Consequently, the test period required for testing only the common channels is shorter than the time necessary for testing all channels. If, by chance, all common channels are busy or if such a situation is the result of a malfunctioning, establishing a link between the base unit and the mobile unit is no longer possible. In the proposed embodiment of a cordless telephone, reliably establishing a link is guaranteed in that in a first test phase the common channels and in a second test phase all n radio channels are tested. A field of application of the invention is the cordless telephone.

6 Claims, 3 Drawing Sheets

IDENTIFICATION CODE SEARCH IN A COMMUNICATION DEVICE

This is a continuation of application Ser. No. 07/533,652, filed on Jun. 5, 1990, now abandoned.

BACKGROUND OF THE INVENTION

1. Field of The Invention

The invention relates to communication devices which are assigned to each other in pairs, one unit sending out an identification code for establishing a link to the other unit over one of n channels and the other unit searching for the channel transporting this identification code while a number of m smaller than n channels between the two units are determined as priority channels.

2. Related Art

Communication devices assigned to each other in pairs are used, for example, for cordless telephones where a base station (unit) and a mobile station (unit) form a pair of communication stations. The combination of the base station and mobile station to one pair of units is effected by means of an individual identification code jointly issued to the two units. This identification code is, for example, a binary data word which is already stored in read-only memories of the two units when manufactured. This assures that each identification code assigned to a pair of units is not assigned a second time to another unit. The power of the mobile unit is supplied by accumulators which are charged by the base station when the mobile unit rests on it. The base unit sends out its identification code over an idle radio channel when a call arrives from a telephone subscriber. In order to take an arriving call the mobile unit thus has to carry out a constant check of the radio channels assigned thereto to establish whether its own identification code is transmitted over a radio channel.

The time elapsing between the transmission of the unit's identification code and its recognition depends among other things on the number of radio channels to be tested. To reduce this time interval European Patent Application No. EP 0 258 739 discloses that the two radio stations of each pair have m radio channels in common and store them in RAM's. Radio channels recognized as idle, when the channels are determined, are selected to act as common radio channels. During the test cycle the mobile unit only searches the common radio channels. Consequently, the period of time necessary for testing the common channels is shorter than the period of time necessary for testing all channels.

If, by chance or malfunction, all common channels are busy establishing a link between the base unit and the mobile unit will no longer be possible.

SUMMARY OF THE INVENTION

It is an object of this invention to guarantee a reliable establishing of links with a radio station in a communication system of the type mentioned in the opening paragraph.

This object is achieved in that in a first test phase the common m radio channels and in a second test phase all n radio channels are tested.

The mobile units powered by accumulators have only a limited operating time when they are not in the stand-by mode, that is to say, when the mobile unit does not rest on the base unit and is not powered thereby. It is a further object of the invention to increase the operating time of the mobile unit when the unit is not in the stand-by mode.

The object is achieved in that the individual test periods are interrupted by pauses in which only with a very low power consumption the readiness for operation is maintained. Since there is only little power consumption for maintaining the readiness for operation, the working time of the mobile unit is extended owing to the intermittently rather small power load of the accumulators.

BRIEF DESCRIPTION OF THE DRAWINGS

The invention will be further described and explained in the sequel with reference to an exemplary embodiment in which the drawing shows.

DETAILED DESCRIPTION OF THE PREFERRED EMBODIMENT

Figure 1:
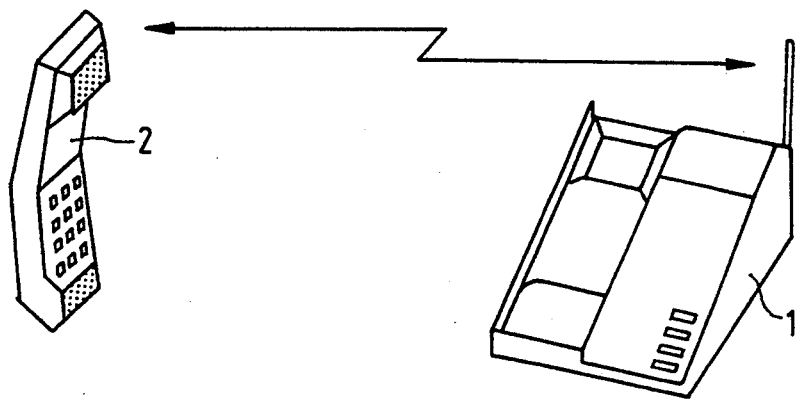
In FIG. 1 a pair of units of a cordless telephone.
Figure 2:
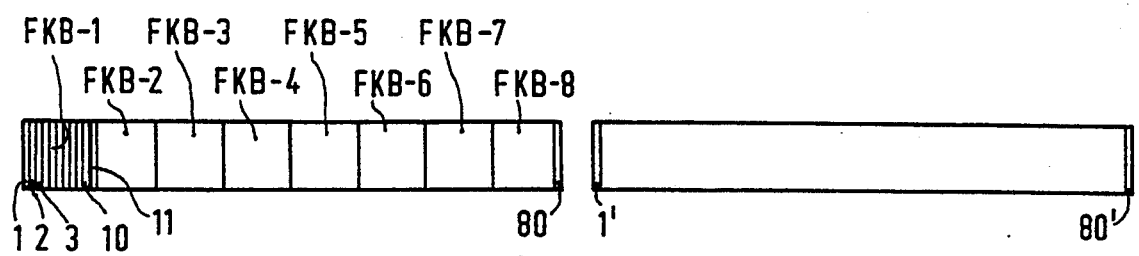
In FIG. 2 a diagrammatic representation of the radio channels.

In the exemplary embodiment a base unit 1 connected to a communication line and a mobile unit 2 assigned to this base unit form a pair of units of a so-called cordless telephone. In the exemplary embodiment of the invention eighty duplex radio channels are available to the base unit 1 and the mobile unit 2 assigned to the base unit 1. In FIG. 2 one half of the Figure shows the eighty radio channels 1 . . . 80 that may be used by the base unit 1 in the send direction. The reverse channels 1' . . . 80' assigned to these radio channels and over which the base unit receives information have a duplex spacing of 45 MHz. They are shown in the right-hand half of the Figure.

In order to ensure that only matching units can establish a telephone connection, an identification code is transmitted over an idle duplex channel by the initiating unit. If the base unit, for example, wishes to establish a connection, it occupies an idle radio channel and transmits its identification code for a preset period of time. Since this identification code is specifically preset for each pair of radio stations, it will be designated in the sequel as the unit's own identification code. The receiver of the partner unit, in this case the mobile unit, in the stand-by mode cyclically searches all assigned radio channels for an RF signal having the unit's own identification code. If the mobile unit recognizes its own identification code, it will occupy the reverse direction of the duplex channel and acknowledge in its turn by means of its own identification code. Once this code is recognized by the initiating unit at the return frequency, the transmission of the unit's own identification code is stopped, i.e. the radio link is established 412.

On the basis of a group number assigned to each pair of radio stations comprising a base unit and a mobile unit, a specific number of radio channels is allocated to the pair of radio stations as priority channels. Preferably, the total number of radio channels may be subdivided for this purpose into channel groups according to a power of two. In the exemplary embodiment the total number of channels is subdivided into eight channel groups so that ten radio channels are assigned to each channel group. Which channel group is assigned to a pair of radio stations as a priority channel block depends on the group number of the pair of radio stations. In the exemplary embodiment this group number is stored in an EPROM in a binary representation when the pairs of radio stations are manufactured. When the units are manufactured all group numbers are assigned equally often. Owing to the mixing of the pairs of radio stations when they are distributed, a statistical, that is to say, highly uniform distribution of these group numbers may be expected, so that neighbouring users of such pairs of radio stations will most probably obtain different priority channels.

The priority channels combined in a channel group are preferably directly adjacent so that they constitute in this manner a radio channel block FKB-1, FKB-2, . . . . This is specifically advantageous because the change from one channel to a directly adjacent radio channel requires a shorter locking time than the change from the one radio channel to another, more remote radio channel.

Once a call arrives at the base unit over the communication line 401, the base unit searches for an idle channel among the priority channels and sends out its own identification code over this channel for a limited period of time, the so-called initial period $t_E$ 405. In most cases an idle channel will be found among the priority channels 403, 407. With extremely heavy traffic loads, that is to say, if there are many adjacent pairs of radio stations, for example, in an office flat or at an exchange, all priority channels may be busy 403, 406. In these rare cases the base unit searches for a free channel among all the radio channels 404 and will send out its own identification code over this idle channel 405.

The mobile unit 2 when removed from the base unit 1 is to carry out a constant check whether a call arriving at the base unit 1 is also arriving at the mobile unit. For this purpose, the mobile unit 2 is to test all relevant radio channels over which the base unit may send out a request for establishing a link.

In a first test phase P1 the mobile unit 2 first passes through the block of priority channels predetermined by means of the group number 410. In the exemplary embodiment this is the channel block FKB-2. If the mobile unit does not recognize its own identification code on any one of the searched channels 11 . . . 20 of the block of priority channels 411, 418, it will change to "stand by" (power saving) for a defined stand-by period $t_W$ 414. In this mode the receive section is deactivated so that consequently the power consumption of the mobile unit is considerably reduced. After the stand-by period $t_W$ following the first test phase, a second test phase will follow.

In the second test phase P2, the mobile unit 2 passes through all eighty available radio channels when testing the radio channels 415. After the radio channels have been passed through the mobile unit will again change to the stand-by mode for the stand-by period $t_{W'}$ 417. The first and second test phases together form a test cycle.

Alternately searching the priority channels FKB-2 and all eighty radio channels 1 . . . 80 ensures that a request, for establishing a link, which is not sent over a priority channel will reach the mobile unit. For this purpose, the time for going through a test cycle is selected to be shorter than the initial period $t_E$. A test cycle is composed of a test phase P1 and P2 and stand- by periods $t_W$ and $t_{W'}$ respectively. In the exemplary embodiment the initial period $t_E$ is 3 seconds, the first test phase approximately 0.2 seconds and the second test phase approximately 0.9 seconds with an overall test cycle time $t_p$ of 2.5 seconds.

Figure 3A:
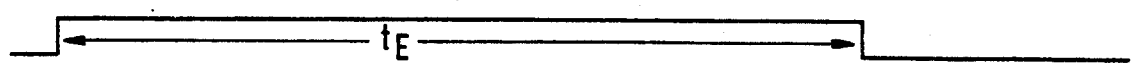
In FIG. 3A the position of an initial time period.
Figure 3B:
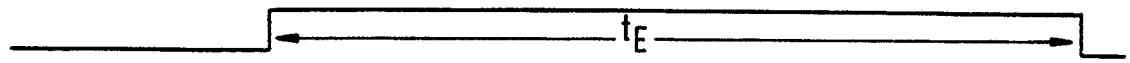
In FIG. 3B the position of a delayed time period.
Figure 3C:
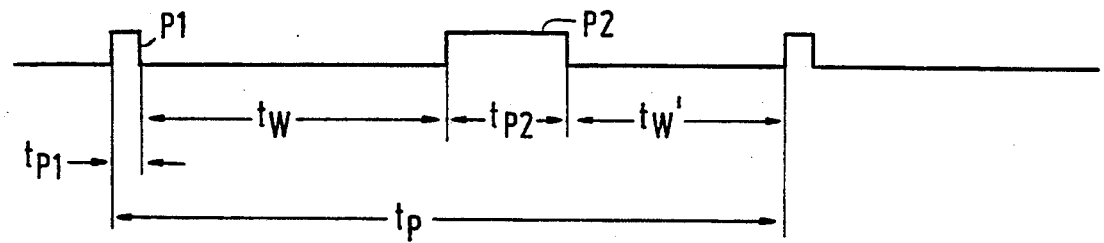
In FIG. 3C the timing of a test cycle.
Figure 4A:
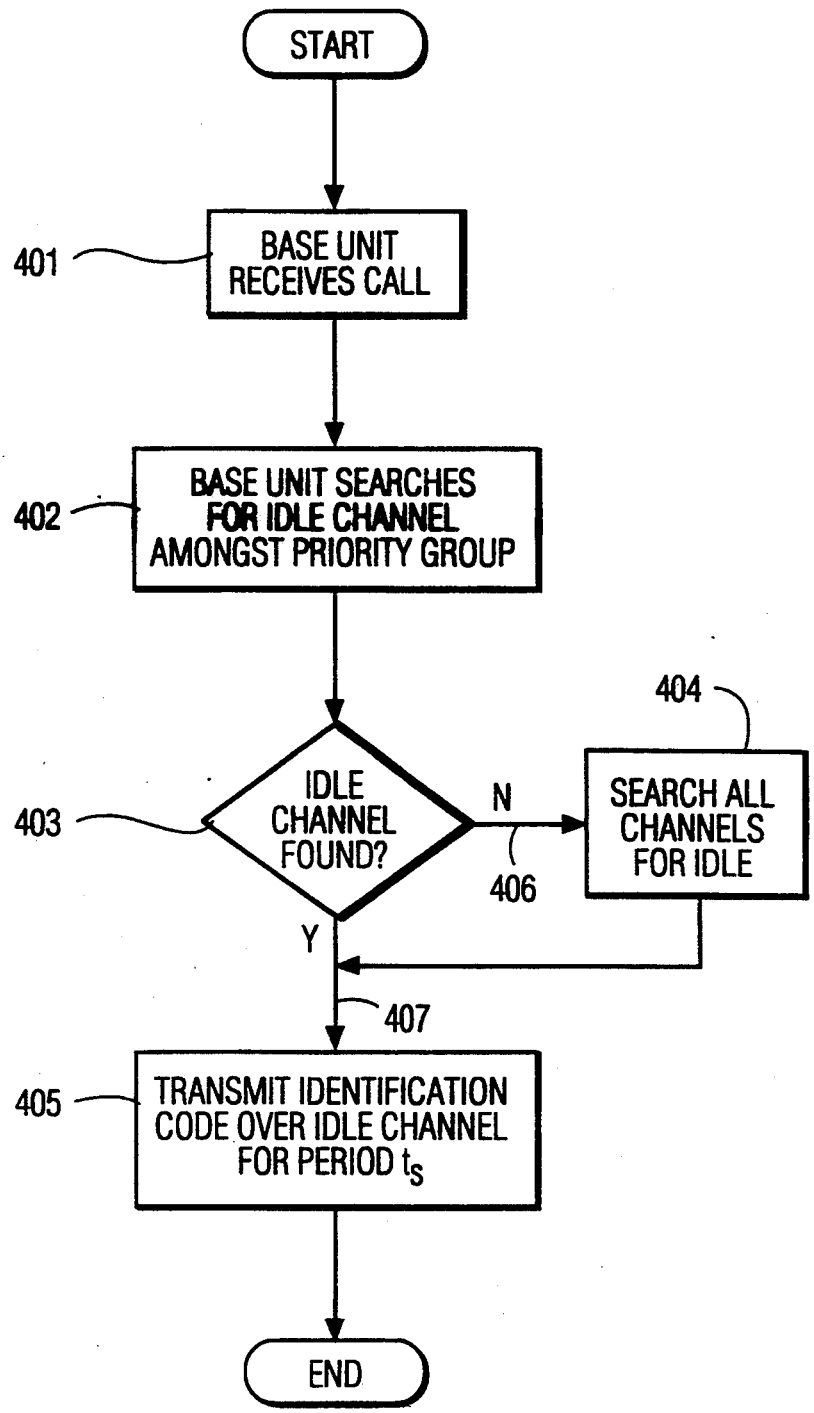
In FIG. 4a, a flowchart showing operation of a base unit according to the invention.
Figure 4B:
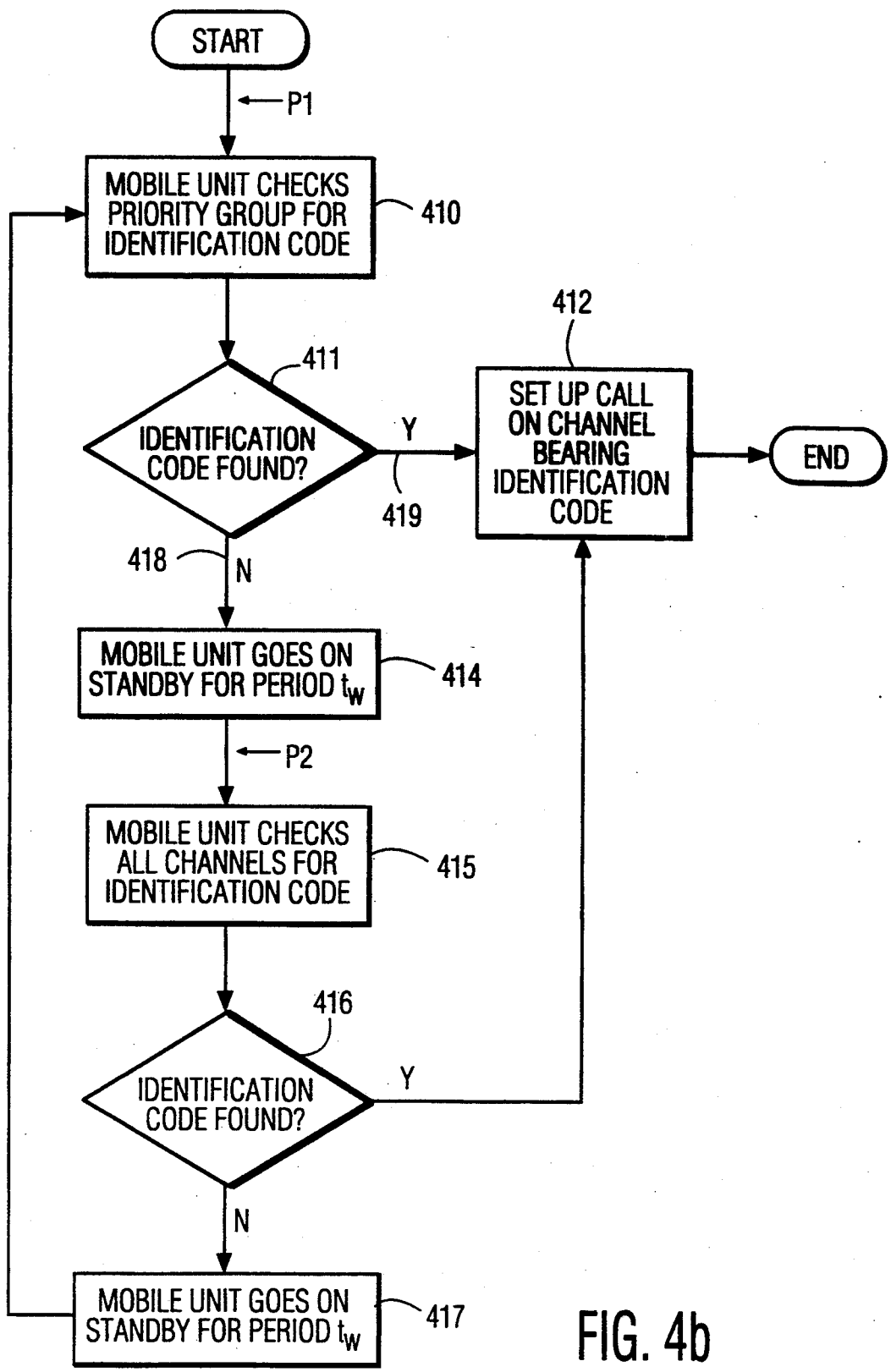
In FIG. 4b, a flowchart showing operations of a mobile unit according to the invention.

FIG. 3c shows in a time diagram the consecutive test phases P1, P2 respectively with the respective intermediate stand-by periods $t_W$ and $t_{W'}$. FIG. 3a shows the send time of an initial signal. The initial signal here commences shortly before the beginning of the test phase P1. This is a favourable instant. Since in most cases an idle channel may be found in the block of priority channels 419, in this case the base unit's own identification code is sampled as early as in the first test phase. But also if only a single radio channel outside the priority channel block is selected as a transmission channel, FIG. 3a shows that approximately in the middle of the initial period $t_E$ during the second test phase P2 this radio channel would be sampled. Consequently, the average recognition time is a quarter of the test time $t_p$, 0.75 seconds in the exemplary embodiment. This is an altogether acceptable value.

Restricting the search to the priority channels during the first test phase P1 allows the mobile unit to realize power saving during the stand-by phases. In comparison, devices that operate without a priority channel have to pass through a complete (second) test phase P2 twice, while having a comparable average recognition time for unequivocal recognition of the unit's own identification code on one of the eighty radio channels. The power saving that can be achieved in this way with a negligeably small power consumption during the stand-by periods $t_W$ and $t_{W'}$ approaches leads to $$\frac{t_{p2} - t_{p1}}{2 * t_{p2}}$$

In the exemplary embodiment, a reduction of power consumption of approximately 39% is shown. As a result the working time of the mobile unit 2, when disconnected from the base unit 1, is accordingly extended.

FIG. 3b shows the initial period beginning between the first and second test phases. From the Figures it may be evident that irrespective of the instant at which the initial period commences, the second test phase P2 is always situated within the initial period. Thus the reception of the unit's own identification code itself is guaranteed even if it is not situated in the block of priority channels.

We claim:

1. Method for establishing a communication link comprising,
    (a) in a first communication device, the step of sending out an identification code over one of n radio channels, where n is an integer, for an initial period ($t_E$);
    (b) in a second communication device the steps of searching for the identification code, said searching including repeatedly applying a test cycle, and exiting the test cycle if the identification code is found, the test cycle including the steps of:
        i) first searching a group of m priority channels where m is an integer and m<n;
        ii) first standing by for a first stand-by time;
        iii) second searching all n channels; and
        iv) second standing by for a second stand-by time, whereby the test cycle is shorter than the initial period; and (c) upon finding the identification code, setting up the second communication device to operate using a channel on which the identification code was found.

2. The method of claim 1 wherein the second communication device is a mobile unit of a cordless telephone, and wherein the first standby time is longer than the second stand-by time in the test cycle to increase a time during which the mobile unit can be operated separately from a base station without recharging.

3. A method for establishing a communication link between a pair of communication devices comprising the steps of:

(a) from a first unit, sending out an identification code over one of n radio channels, wherein n is an integer; and (b) in a second unit searching for the identification code according to a test cycle, the test cycle including executing a first test phase and second test phase, the first test phase including searching m radio channels, where m is an integer less than n, and the second test phase including i) putting the second unit in a standby mode for a first time interval;

ii) searching all n radio channels if the identification code is not found in the first test phase; and iii) if the identification code is not found in the second test phase, the second test phase also including putting the second unit in the standby mode for a second time interval, the first and second time intervals being chosen so that the total test cycle is shorter than a transmission time for the identification code.

4. The method of claim 3 wherein the m channels form a contiguous block with the n channels.

5. The method of claim 3 wherein the n are channels divided into a plurality of blocks of m channels, where m is an integer less than n and each block is assigned a group number and, during manufacturing, a group number is assigned to the first unit and a second unit; and the first test phase includes searching m radio channels chosen according to the group number of the first and second unit.

6. The method of claim 3 in which the test cycle includes alternately executing the first phase and the second phase.

* * * * *